United States Patent
Rocereto

(10) Patent No.: US 11,137,477 B1
(45) Date of Patent: Oct. 5, 2021

(54) VEHICLE SENSOR CALIBRATION TEMPLATE

(71) Applicant: Jacob Rocereto, Pensacola, FL (US)

(72) Inventor: Jacob Rocereto, Pensacola, FL (US)

(*) Notice: Subject to any disclaimer, the term of this patent is extended or adjusted under 35 U.S.C. 154(b) by 309 days.

(21) Appl. No.: 16/459,646

(22) Filed: Jul. 2, 2019

(51) Int. Cl.
  *G01S 7/40* (2006.01)
  *G01S 13/06* (2006.01)
  *G01S 13/931* (2020.01)
  *G01S 13/86* (2006.01)
  *G05D 1/00* (2006.01)

(52) U.S. Cl.
  CPC ............ *G01S 7/40* (2013.01); *G01S 13/06* (2013.01); *G01S 13/867* (2013.01); *G01S 13/931* (2013.01); *G05D 1/0094* (2013.01); *G01S 2013/93271* (2020.01); *G01S 2013/93272* (2020.01); *G05D 2201/0213* (2013.01)

(58) Field of Classification Search
  CPC ........ G01S 7/40; G01S 13/06; G01S 13/931; G01S 13/867; G01S 2013/93272; G01S 2013/93271; G05D 1/0094; G05D 2201/0213
  USPC ........................................................ 701/301
  See application file for complete search history.

(56) References Cited

U.S. PATENT DOCUMENTS

| | | | |
|---|---|---|---|
| 4,208,798 A | 6/1980 | Sampson | |
| 6,000,748 A | 12/1999 | Tomforde et al. | |
| 8,401,236 B2 | 3/2013 | Kassouf et al. | |
| 8,490,290 B2 | 7/2013 | Stief et al. | |
| 8,830,119 B2 | 1/2014 | Borruso | |
| 9,134,120 B2* | 9/2015 | Schommer | G01S 7/40 |
| 9,182,477 B2 | 11/2015 | Jones et al. | |
| 9,201,424 B1 | 12/2015 | Ogale | |
| 9,279,882 B2* | 3/2016 | Hukkeri | G01S 7/52004 |
| 9,541,633 B2 | 1/2017 | Rybski | |
| 9,546,888 B2 | 1/2017 | Von Scholten | |
| 9,719,817 B2 | 8/2017 | Ham et al. | |
| 9,952,317 B2* | 4/2018 | Valois | G01S 7/497 |
| 10,397,495 B1* | 8/2019 | Graber | B64D 47/08 |
| 10,625,676 B1* | 4/2020 | Tsimhoni | A63F 13/25 |
| 10,742,969 B1* | 8/2020 | Rohatgi | G06T 7/20 |
| 2004/0030474 A1* | 2/2004 | Samuel | B60T 8/885 |
| | | | 701/36 |
| 2010/0177304 A1 | 7/2010 | Rogers | |
| 2010/0186244 A1 | 7/2010 | Schwindt | |
| 2014/0092236 A1* | 4/2014 | Findeisen | B60L 53/37 |
| | | | 348/118 |
| 2017/0323459 A1* | 11/2017 | Ermilios | G06T 7/80 |

(Continued)

*Primary Examiner* — Muhammad Shafi
(74) *Attorney, Agent, or Firm* — Peter Loffler

(57) ABSTRACT

A template for accurately positioning target points and patterns for aligning various sensors and cameras of a vehicle uses a front template that is positioned against the front tires of the vehicle while a rear template is positioned against rear tires and each template is properly aligned. A pair of side templates for placement of camera patterns thereon is positioned against either side of the front and rear templates. A forward radar sensor template abuts the forward side of the front template while a pair of rear corner radar templates each abut a respect one of the rear templates. When installed, a technician places appropriate targets or patterns on the various marks on the various templates, the marks being precisely located for targeting sensors and cameras for a given make and model of a vehicle which targeting allows the sensors and cameras to be calibrated.

16 Claims, 5 Drawing Sheets

(56) References Cited

U.S. PATENT DOCUMENTS

2018/0372467 A1* 12/2018 Yokoyama .............. G01B 3/04
2019/0064320 A1 2/2019 Zack et al.

* cited by examiner

VEHICLE SENSOR CALIBRATION TEMPLATE

BACKGROUND OF THE INVENTION

1. Field of the Invention

The present invention relates to a ground located template that is used to mark and place appropriate targets for the various sensors and cameras of a vehicle for calibration of the sensors and cameras, the template being sized and configured for the specific vehicle make and model.

2. Background of the Prior Art

Modern vehicles are safer than they have ever been. Modern vehicles come with the standard physical vehicle safety systems that have been developed and implemented over the years. Such systems include seatbelts including the use of pretensioners, airbags on the front, sides, head and leg areas, body crumple zones, antilock brakes, shatter resistant glass, and vehicle stability control, among others. Such systems have saved numerous lives as well as reduced the severity of injuries in countless vehicle crashes over the years.

Recently, vehicles, even low-cost entry level vehicles, are coming equipped with an ever-expanding array of electronic based safety systems designed to help avoid a vehicle collision or otherwise reduce the severity of the collision. Such systems include forward-collision warning which gives a driver a visual and/or audible warning that alerts the driver of an impending collision so that the driver can avoid the collision. Automatic emergency braking automatically applies a vehicle's brakes to prevent a collision or reduce the collision speed when the system detects an imminent collision with an object such as a vehicle directly in front. Pedestrian detection systems detect pedestrians in the vehicle's travel path and either issue a warning or trigger automatic emergency braking or both. Lane departure warning systems detect when the vehicle is departing from the travel lane and issue a visual, audible, or haptic warning to alert the driver. Additionally, some vehicles also have a lane keeping assist system that automatically corrects the vehicle's steering input in order to return or keep the vehicle in its travel lane. Blind spot warning systems issue a visual and/or audible notification whenever another vehicle is in the travel vehicle's blind spot. Some systems give a further warning if the travel vehicle's turn signal is activated indicating an intention to move to the lane that has the other vehicle in the blind spot. Adaptive cruise control systems automatically adjust the vehicle's speed from the set speed whenever the vehicle is approaching another vehicle that is in the first vehicle's travel lane. Many other electronic safety systems are available and many more are in the design and development stages as the vehicle industry progresses toward driverless vehicles.

These modern safety systems rely on various electronic sensors and cameras placed about the vehicle, typically on the body panels or on the windows of the vehicle, to detect the conflict object (another vehicle, pedestrian, etc.,) or procedure of the vehicle being undertaken so as to issue appropriate warnings and/or automatically have the vehicle implement corrective action to avoid the conflict or correct the procedure being undertaken. These sensors and cameras and the underlying logic that controls them are extremely sophisticated yet highly accurate in the prosecution of their respective undertakings to make the vehicle travel safer than ever before, despite the overall increase in typical vehicle speeds.

In order for the sensors and cameras to operate correctly in performing their given tasks, the sensors must be calibrated correctly, that is, the sensors and cameras must be properly aimed at their target location with a relatively high degree of precision. During normal vehicle operation, such sensors and cameras stay in proper calibration. However, over extended periods of vehicle usage, the sensors and cameras may work out of an acceptable alignment range due to the bumps and thumps experienced by vehicle as it travels the various highways and byways. Additionally, if the vehicle is involved in a collision, even a very minor one that may otherwise not require any corrective body work, chances are at least some of the sensors may have been pushed out of alignment and require calibration from a trained technician. If an owner changes the vehicle's drive configuration, such as adding different shocks or springs or changing to different sized tires, especially if the aspect ratio of the tires changes, then at least some, if not all of the sensors and cameras require calibration. If a sensor is replaced due to that sensor's failure, the new sensor must be calibrated.

In order to calibrate a vehicle's sensors and cameras, a technician must "aim" the sensor or camera at a target that is located a precise location (distance and geometry) from the vehicle and make sure that the sensor or camera can "see" the target at this position. Each sensor or camera must be individually calibrated in this fashion. This process is time and labor intensive and is expensive—one need only get an estimate for a wheel alignment for a vehicle with adaptive cruise control to verify this expensive nature of sensor calibration. The position for each target must be separately calculated, often using elaborate equipment that is difficult to set up and use, and once the position so calculated the appropriate target placed thereat. Several technician hours can be expended for a typical overall vehicle sensor and camera calibration.

Devices have been proposed that attempt to simplify the target position location process in order to attempt to expedite the calibration process. Such systems, which come in a wide variety of architectures and work with varying degrees of effectiveness, have certain drawbacks. Some systems are complex in design and construction so that their acquisition and maintenance make these systems cost-prohibitive. Some systems are designed for a single sensor system, for example, the lane departure system, so that a repair facility needs to purchase multiple systems and train technicians on each system in order to be able to calibrate all sensors and cameras on a vehicle. Some systems simply take more time and effort to use than current manufacturer provided procedures. Some systems are imprecise so that the target position may not be the optimal position for the calibration of the particular sensor or camera.

What is needed is a system that aid a technician in the quick and easy calibration of vehicle sensors and cameras and that addresses the above stated drawbacks found in the art. Specifically, such a system must allow a technician to be able to quickly and easily determine the correct target positions for the various sensors and cameras of a vehicle so as to reduce the time to perform the calibrations relative to current manufacturer implemented methods. Such a system must be of relatively simple design and construction and be usable for target position acquisition for almost all vehicle sensors and cameras related to vehicle safety systems.

SUMMARY OF THE INVENTION

The vehicle sensor calibration template of the present invention addresses the aforementioned needs in the art by providing a system that allows a technician to quickly and easily determine precise target positions for the placement of targets thereat in order to allow a vehicle's sensors and cameras to be calibrated using the correctly placed targets. The vehicle sensor calibration template is of relatively simple design and construction, being produced using standard manufacturing techniques, so as to make the device relatively inexpensive to produce so as to make the device economically attractive to potential consumers for this type of device. The vehicle sensor calibration template allows almost all target positions for a given vehicle to be obtained using the system, even if the vehicle's thrust angle is not true. The vehicle sensor calibration template does not rely on elaborate or complicated subsystems to use, so that training technicians on the correct use of the vehicle sensor calibration template is relatively simple and straightforward.

The vehicle sensor calibration template of the present invention is comprised of a front template that has a first front side and an opposing second front side joined by a third front side and an opposing fourth front side. The front template has a first upper surface and a first lower surface. A front zero mark is located on the first upper surface centrally between the third front side and the fourth front side and proximate the first front side. A first front sensor mark is located on the first upper surface centrally between the third front side and the fourth front side and located between the front zero mark and the second front side. A rear template has a first rear side and an opposing second rear side joined by a third rear side and an opposing fourth rear side. The rear template has a second upper surface and a second lower surface. A rear zero mark is located on the second upper surface centrally between the third rear side and the fourth rear side and proximate the first rear side. A rear squaring mark is located on the second upper surface centrally between the third rear side and the fourth rear side and between the rear zero mark and the second rear side. A second sensor mark is located on the second upper of the rear template. The front template is positioned proximate a front end of the vehicle and the rear template is positioned proximate a rear end of the vehicle such that the front zero mark, the rear zero mark and the rear squaring mark are all aligned on a single axis that passes longitudinally through a center of the vehicle. A second front sensor mark may be located on the first upper surface of the front template on a first side of the first front sensor mark while a third front sensor mark may be located on the first upper surface of the front template on a second side of the first front sensor mark such that the first front sensor mark is located centrally (exactly half way) between the second front sensor mark and the third front sensor mark. A first camera pattern may be located on the first upper surface of the front template proximate the third front side while a second camera pattern may be located on the first upper surface of the front template proximate the fourth front side. A third camera pattern may be located on the second upper surface of the rear template proximate the third rear side while a fourth camera pattern may be located on the second upper surface of the rear template proximate the fourth rear side. A first side template has a third upper surface and a third lower surface and has a fifth camera pattern located on the third upper surface such that the first side template is positioned on a passenger side of the vehicle proximate the third front side of the front template and the third rear side of the rear template. A second side template has a fourth upper surface and a fourth lower surface and has a sixth camera pattern located on the fourth upper surface such that the second side template is positioned on a driver side of the vehicle proximate the fourth front side of the front template and the fourth rear side of the rear template. A satellite template has an upper surface and a lower surface and is positioned proximate the second front side of the front template. The satellite template has a radar mark on its upper surface. The radar mark is located on the single axis. A first corner template has an upper surface and a lower surface and has a first corner mark on its upper surface. The first corner template is positioned proximate the third rear side of the rear template. A second corner template also has an upper surface and a lower surface and has a second corner mark on the its upper surface. The second corner template is positioned proximate the fourth rear side of the rear template. A laser is attached to the first upper surface of the front template such that the laser issues a laser line that overlays the single axis.

BRIEF DESCRIPTION OF THE DRAWINGS

Similar reference numerals refer to similar parts throughout the several views of the drawings.

DESCRIPTION OF THE PREFERRED EMBODIMENT

Figure 1:
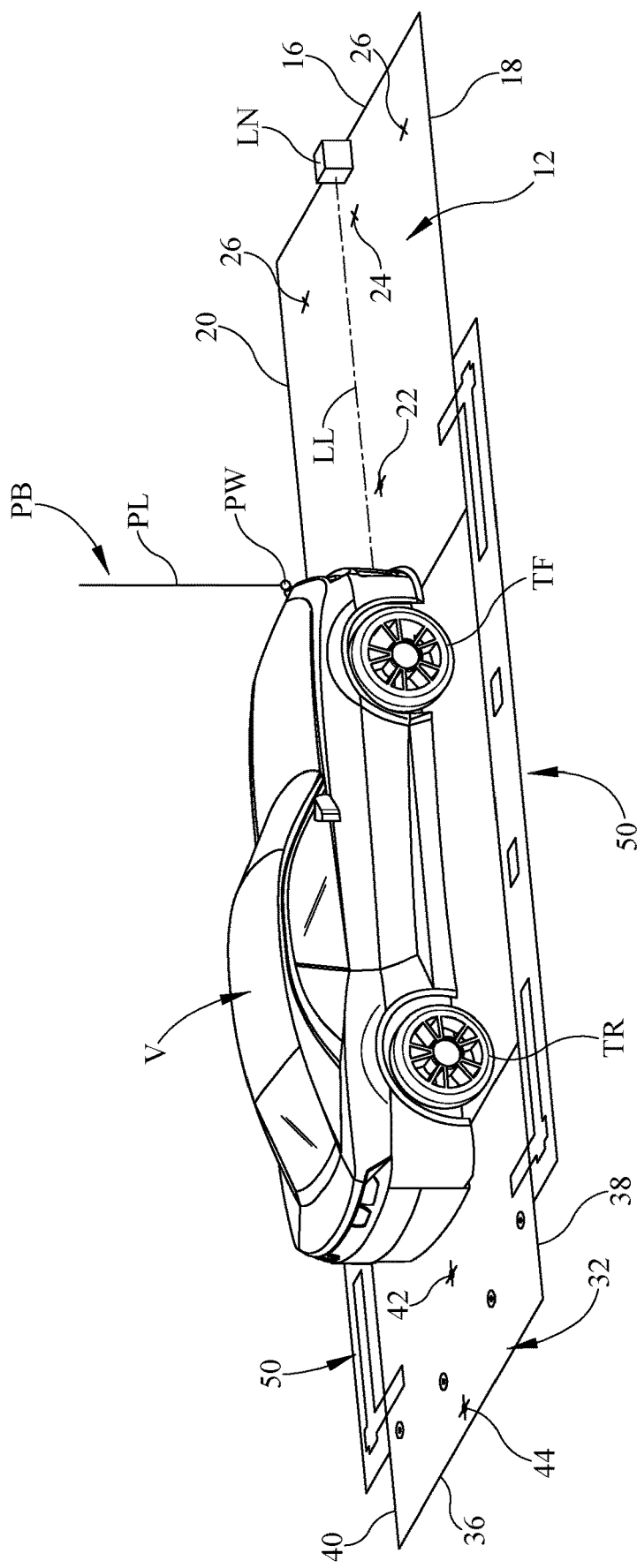
FIG. 1 is an environment vial of the vehicle sensor calibration template of the present invention.
Figure 2:
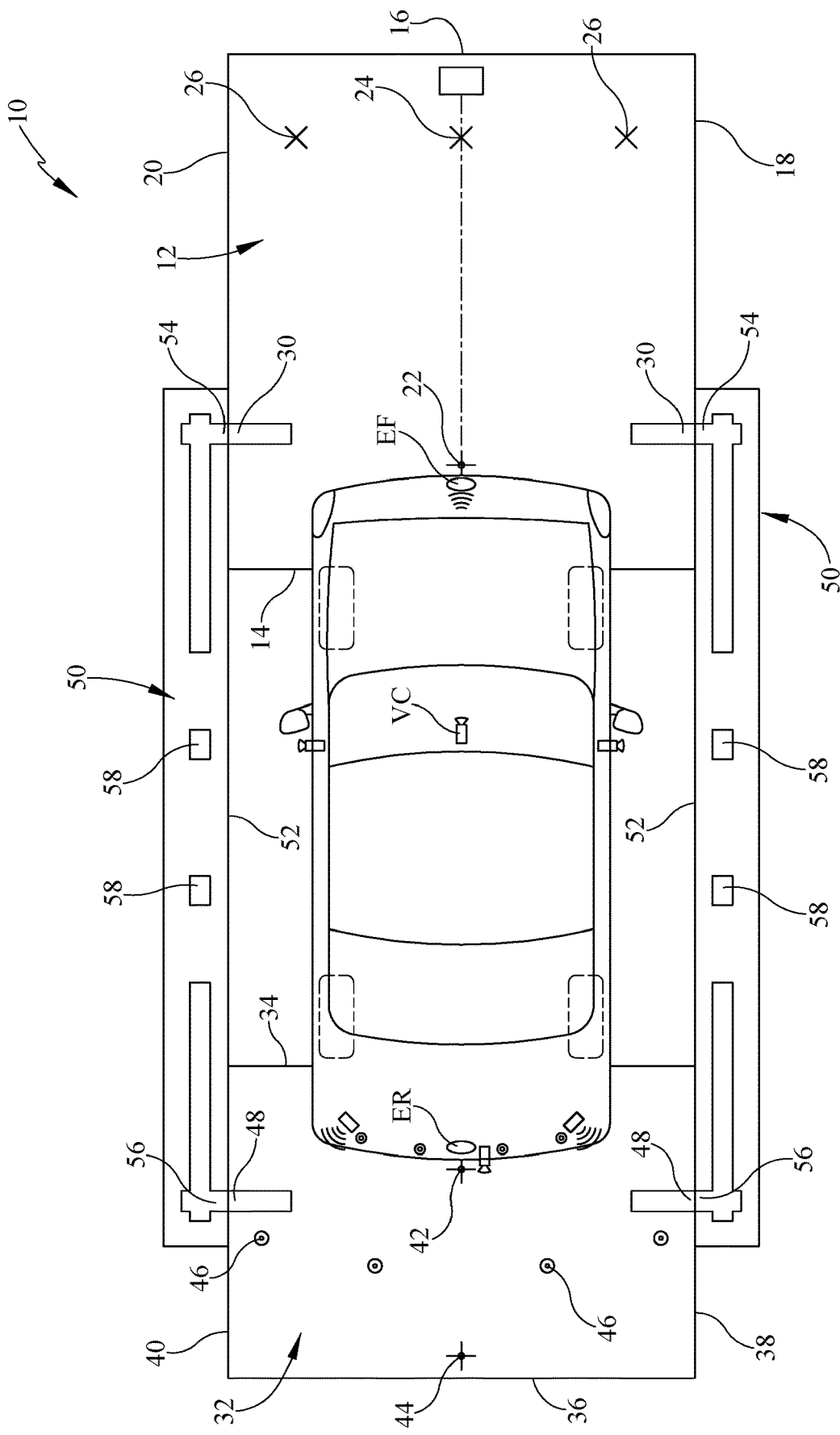
FIG. 2 is a top plan view of the vehicle sensor calibration template installed about a vehicle.
Figure 3:
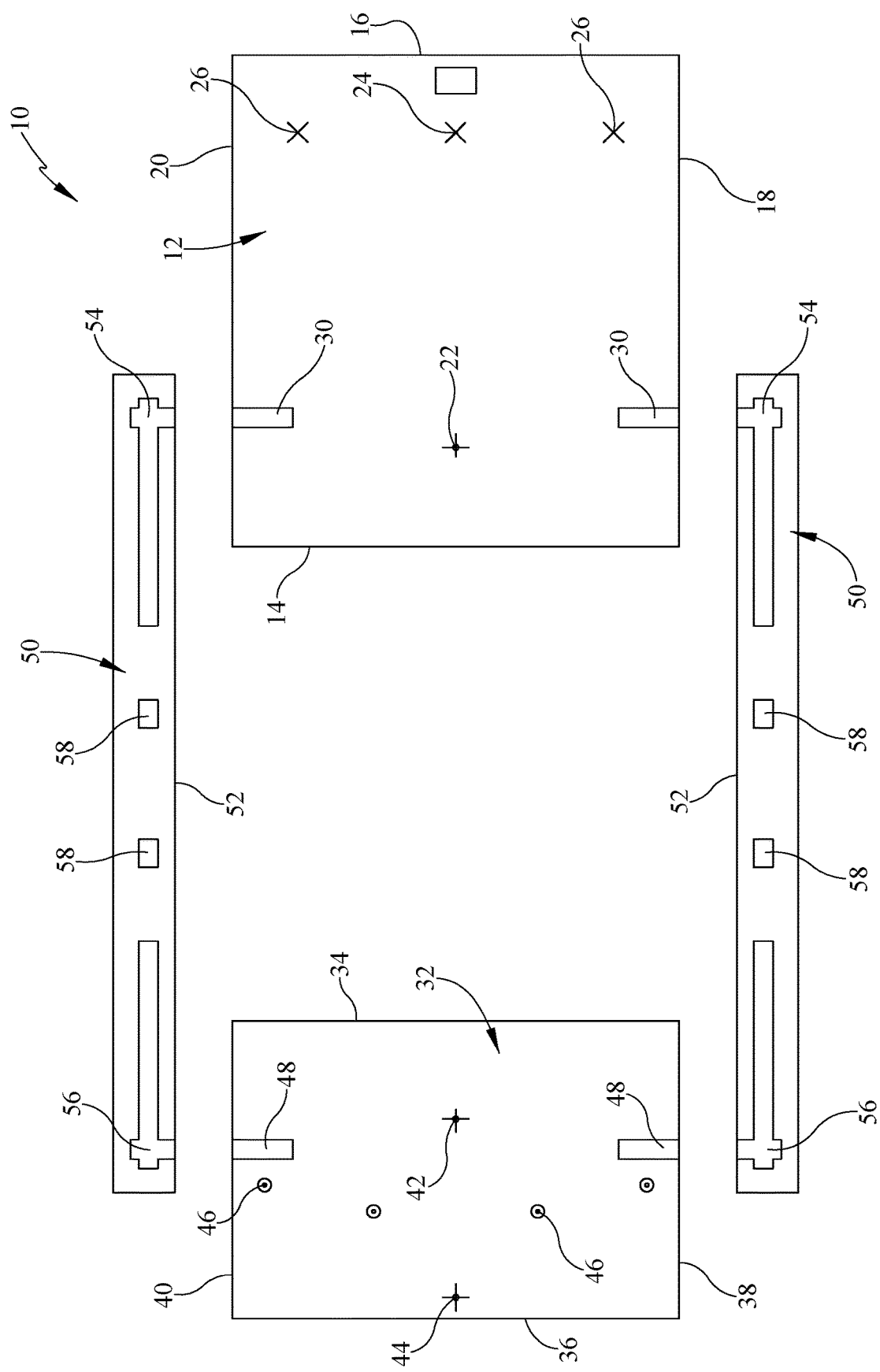
FIG. 3 is a top plan view of the vehicle sensor calibration template.
Figure 4:
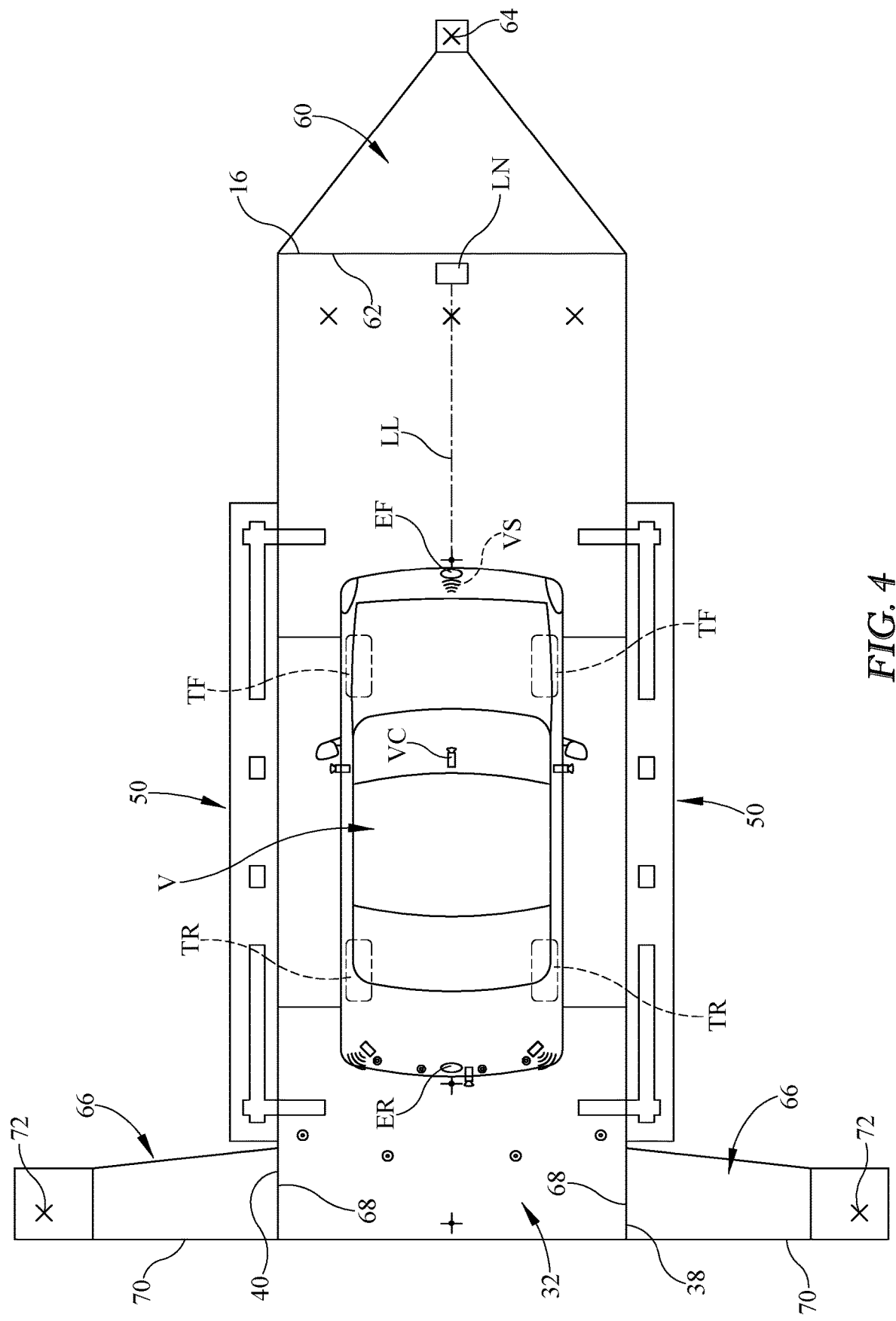
FIG. 4 is a top plan view of the vehicle sensor calibration template installed about a vehicle with a front satellite template and rear corner satellite templates also installed.
Figure 5:
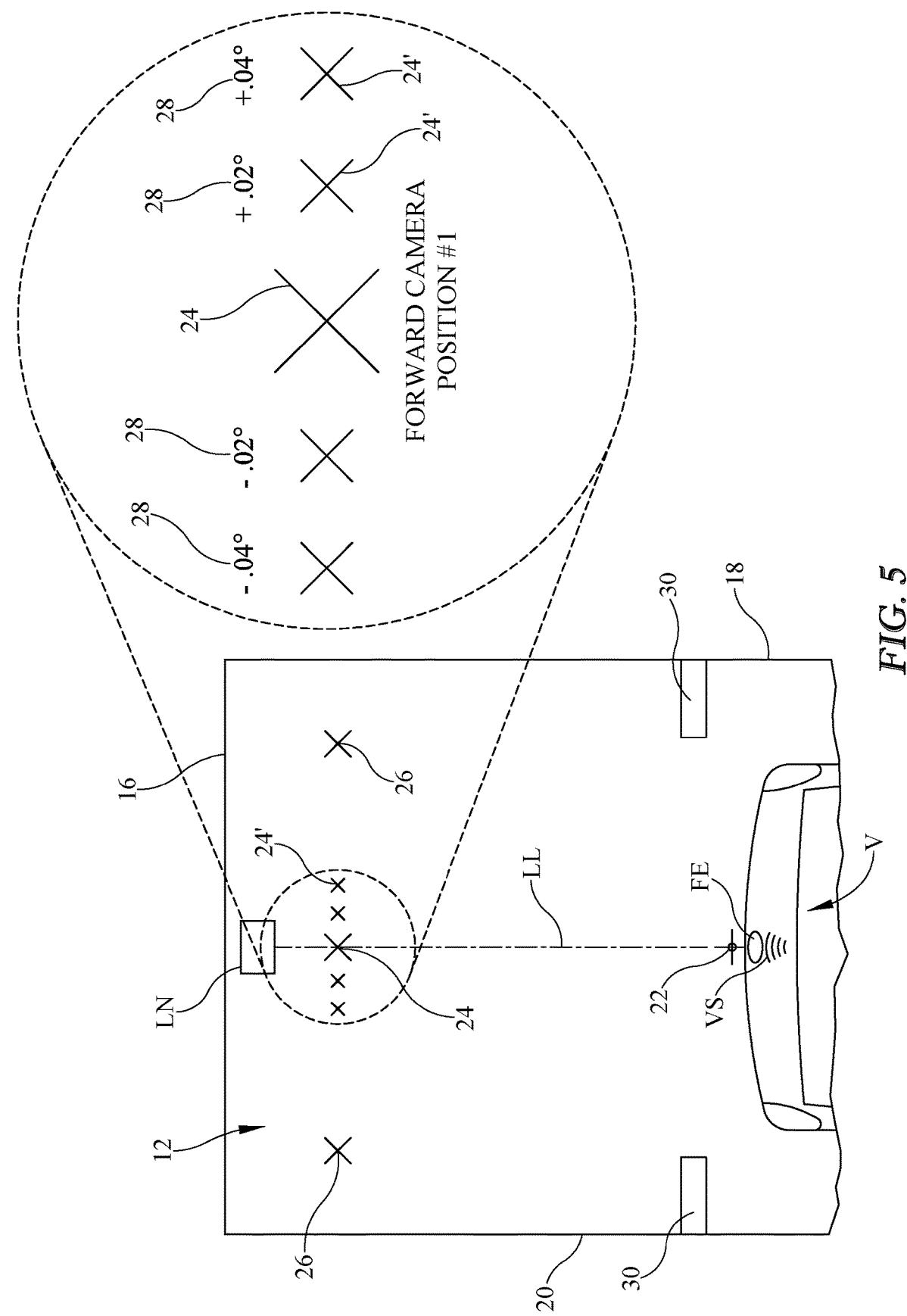
FIG. 5 is a close-up view of the front template illustrating the vehicle thrust offset sensor marks.

Referring now to the drawings, it is seen that the vehicle sensor calibration template of the present invention, generally denoted by reference numeral 10, is comprised of a front template 12 that has a first front side 14 and a second front side 16 joined by a third front side 18 and a fourth front side 20. As seen, located on an upper surface of the front template 12 is a front zero point marking 22, a front camera marking 24, and forward sensor markings 26. Advantageously, the front zero point marking 22 and the front camera marking 24 are each located medially (exactly half way) between the third front side 18 and the fourth front side 20. As seen in FIG. 5, located on either side of the front camera marking 24 are one or more offset markings 24' and possible value labels 28 for each such marking 24'. These offset markings 24' are used when the thrust offset of the vehicle V is known. First front camera patterns 30 are located on the upper surface of the front template 12 proximate the corner of whereat the first front side 14 and third front side 18 meet and the corner whereat the first front side 14 and the fourth front side 20 meet. Additional camera patterns can also be located on the front template 12 depending on the specific vehicle being serviced.

A rear template 32 has a first rear side 34 and a second rear side 36 joined by a third rear side 38 and a fourth rear side

40. As seen, located on an upper surface of the rear template 32 is a rear zero point marking 42 and immediately therebehind a rear squaring mark 44. Advantageously, the rear zero point marking 42 and the rear squaring mark 44 are each located medially (exactly half way) between the third rear side 38 and the fourth rear side 40. Also located on the upper surface of the rear template 32 is a series of sensor markings 46. First rear camera patterns 48 are located on the upper surface of the rear template 32 proximate the corner of whereat the first rear side 34 and third rear side 38 meet and the corner whereat the first rear side 34 and the fourth rear side 40 meet. Additional camera patterns can also be located on the rear template 32 depending on the specific vehicle being serviced.

A pair of side templates 50 each have an axillary side 52 and also have a second front camera pattern 54 on an upper surface thereof and also have a second rear camera pattern 56 thereon. Each side template 50 has one or more additional camera patterns 58 thereon.

A front satellite template 60 has a front satellite edge 62 and a centrally disposed forward radar marking 64 thereon.

A pair of rear corner templates 66 each have a first rear satellite edge 68 and a second rear satellite edge 70 and each have a distal rear radar marking 72 thereon.

Each of the templates 12, 32, 50, 60 and 66 are made from a sheet type of material such as metal, plastic, rubber, or the like and may be made from a flexible material allowing the templates to be rolled or folded for ease of storage and transport.

In order to use the vehicle sensor calibration template 10 of the present invention, the front template 12 is positioned so that its first front side 14 abuts the front tires TF of a vehicle V (or a wheel block positioned against the front tires TF) with the front zero point marking 22 aligned with the center of a front emblem EF of the vehicle V. Similarly, the rear template 32 is positioned so that its first rear side 34 abuts the rear tires TR of the vehicle V (or a wheel block positioned against the rear tires TR) with the rear zero point marking 42 aligned with the center of a rear emblem ER of the vehicle V. This yields a fairly rapid, relatively accurate positioning of the front template 12 and the rear template 32.

For a more accurate placement of the front template 12 and the rear template 32, the front template 12 is positioned proximate the front of the vehicle V and a plumb bob PB is hung in front of the vehicle V so that the plumb bob line PS passes through the center of the front emblem EF (or other appropriate point) of the vehicle V. The front template 12 is moved until the pointed end of the plumb bob weight PW is pointed directly at the center of the front zero point marking 22 with the front template 12 squared with the vehicle V. The rear template 32 is positioned at the rear of the vehicle V. A plumb bob PB is hung in the back of the vehicle V so that the plumb bob line PS passes through the center of the rear emblem ER (or other appropriate point) of the vehicle V. The rear template 32 is moved until the pointed end PE of the plumb bob weight PW is pointed directly at the center of the rear zero point marking 42 with the rear template 32 squared with the vehicle V Thereafter, a laser LN is attached to the front template 12 at a predesignated point that is centrally (exactly half way) disposed between the third front side 18 and the fourth front side 20 of the front template 12 which makes one of the laser light line LL pass centrally through the front zero point marking 22 and thus pass perpendicularly through the first front side 14. The laser line LL passes through the center of the rear zero point marking 42 and the rear template 32 is moved, if needed, so that the laser line LL also passes centrally through the rear squaring mark 44. The laser line LL of the laser LN now passes through three position points (the front zero point marking 22, the rear zero point marking 42, and the rear squaring mark 44 and is aligned centrally with the front emblem EF and rear emblem ER of the vehicle V so that the front template 12 and the rear template 32 are aligned with the vehicle V. The attachment of the laser LN to the front template 12 is in any manner known in the art in such manner so as to assure that the attached laser LN is properly aligned when so attached. Once the front template 12 and the rear template 32 are installed and aligned, the laser LN may be removed.

The basic vehicle sensor calibration template 10 is now installed and ready for use. If need be, the front template 12 and the rear template 32 are blocked or otherwise secured in place in order to prevent accidental movement of the templates 12 and 32 during work on the vehicle V.

If needed, each side template 50 is installed by abutting (or overlapping) the auxiliary side 52 of one of the side templates 50 against the third front side 18 of the front template 12 and the third rear side 38 of the rear template 32 so that the first front camera pattern 30 of the front template 12 aligns with the second front camera pattern 54 of the side template 50 and the first rear camera pattern 48 of the rear template 32 aligns with the second rear camera pattern 56 of the side template 50. Similarly, the auxiliary side 52 of the other of the side templates 50 abuts (or overlaps) against the fourth front side 20 of the front template 12 and the fourth rear side 40 of the rear template 32 so that the first front camera pattern 30 of the front template 12 aligns with the second front camera pattern 54 of the side template 50 and the first rear camera pattern 48 of the rear template 32 aligns with the second rear camera pattern 56 of the side template 50. Each side template 50 can simply be placed into its proper position (and possibly blocked or otherwise secured thereat) or an appropriate connection means (not illustrated) can be used to attach each side template 50 to the front template 12 and the rear template 32.

The front satellite template 60 is positioned so that its front satellite edge 62 abuts the second front side 16 of the front template 12. Advantageously, the second front side 16 of the front template 12 and the front satellite edge 62 are of equal length so that their respective corners are squared up in order to eliminate the need for a more elaborate alignment of the front satellite template 60 with the front template 12, although other means can be used to position and align the front satellite template 60 with respect to the front template 12. The front satellite template 60 can simply be placed into its proper position (and possibly blocked or otherwise secured thereat) or an appropriate connection means (not illustrated) can be used to attach the front satellite template 60 to the front template 12.

Each rear corner template 66 is installed by abutting the first rear satellite edge 68 of one of the rear corner templates 66 against the third rear side 38 of the rear template 32 and abutting the first rear satellite edge 68 of the other rear corner template 66 against the fourth rear side 40 of the rear template 32. Each rear corner template 66 is positioned so that its respective second rear satellite edge 70 is aligned with the second rear side 36 of the rear template 32 in order to eliminate the need for a more elaborate alignment of the rear corner templates 66. Each rear corner template 66 can simply be placed into its proper position (and possibly blocked or otherwise secured thereat) or an appropriate connection means (not illustrated) can be used to attach each rear corner template 66 and the rear template 32.

The entire vehicle sensor calibration template 10 is now installed and ready for use. Appropriate targets (none illustrated) are now placed at the various marking points for aligning the various sensors VS and cameras VC of the vehicle V in appropriate fashion, the targets being vehicle and sensor and camera manufacturer specific for each particular calibration job.

Of course, the configuration of the vehicle sensor calibration template 10 is custom configured for each make and model of vehicle so that position and number of markings varies depending on which make and model of vehicle is being serviced.

While the invention has been particularly shown and described with reference to an embodiment thereof, it will be appreciated by those skilled in the art that various changes in form and detail may be made without departing from the spirit and scope of the invention.

I claim:

1. A calibration template for calibrating a sensor and a camera of a vehicle, the calibration template comprising:
   a front template having a first front side and an opposing second front side joined by a third front side and an opposing fourth front side, the front template also having a first upper surface and a first lower surface;
   a front zero mark located on the first upper surface centrally between the third front side and the fourth front side and proximate the first front side;
   a first front sensor mark located on the first upper surface centrally between the third front side and the fourth front side and located between the front zero mark and the second front side;
   a rear template having a first rear side and an opposing second rear side joined by a third rear side and an opposing fourth rear side, the rear template also having a second upper surface and a second lower surface;
   a rear zero mark located on the second upper surface centrally between the third rear side and the fourth rear side and proximate the first rear side;
   a rear squaring mark located on the second upper surface centrally between the third rear side and the fourth rear side and between the rear zero mark and the second rear side;
   a second sensor mark located on the second upper; and
   wherein the front template is adapted to be positioned proximate a front end of the vehicle and the rear template is adapted to be positioned proximate a rear end of the vehicle such that the front zero mark, the rear zero mark and the rear squaring mark are all aligned on a single axis that passes longitudinally through a longitudinal center of the vehicle.

2. The calibration template as in claim 1 further comprising:
   a second front sensor mark located on the first upper surface of the front template on a first side of the first front sensor mark; and
   a third front sensor mark located on the first upper surface of the front template on a second side of the first front sensor mark such that the first front sensor mark is located centrally between the second front sensor mark and the third front sensor mark.

3. The calibration template as in claim 1 further comprising:
   a first camera pattern located on the first upper surface of the front template proximate the third front side; and
   a second camera pattern located on the first upper surface of the front template proximate the fourth front side.

4. The calibration template as in claim 3 further comprising:
   a third camera pattern located on the second upper surface of the rear template proximate the third rear side; and
   a fourth camera pattern located on the second upper surface of the rear template proximate the fourth rear side.

5. The calibration template as in claim 4 further comprising:
   a first side template having a third upper surface and a third lower surface and having a fifth camera pattern located on the third upper surface such that the first side template is adapted to be positioned on a passenger side of the vehicle proximate the third front side of the front template and the third rear side of the rear template; and
   a second side template having a fourth upper surface and a fourth lower surface and having a sixth camera pattern located on the fourth upper surface such that the second side template is adapted to be positioned on a driver side of the vehicle proximate the fourth front side of the front template and the fourth rear side of the rear template.

6. The calibration template as in claim 1 further comprising a satellite template having a third upper surface and a third lower surface and positioned proximate the second front side of the front template, the satellite template having a radar mark on the third upper surface, the radar mark aligned on the single axis.

7. The calibration template as in claim 1 further comprising:
   a first corner template having a third upper surface and a third lower surface and having a first corner mark on the third upper surface, the first corner template positioned proximate the third rear side of the rear template; and
   a second corner template having a fourth upper surface and a fourth lower surface and having a second corner mark on the fourth upper surface, the second corner template positioned proximate the fourth rear side of the rear template.

8. The calibration template as in claim 1 further comprising a laser attached to the first upper surface of the front template, the laser issuing a laser line that overlays along the single axis.

9. The calibration template as in claim 1 in combination with the vehicle.

10. The calibration template as in claim 9 further comprising:
    a second front sensor mark located on the first upper surface of the front template on a first side of the first front sensor mark; and
    a third front sensor mark located on the first upper surface of the front template on a second side of the first front sensor mark such that the first front sensor mark is located centrally between the second front sensor mark and the third front sensor mark.

11. The calibration template as in claim 9 further comprising:
    a first camera pattern located on the first upper surface of the front template proximate the third front side; and
    a second camera pattern located on the first upper surface of the front template proximate the fourth front side.

12. The calibration template as in claim 11 further comprising:
    a third camera pattern located on the second upper surface of the rear template proximate the third rear side; and
    a fourth camera pattern located on the second upper surface of the rear template proximate the fourth rear side.

13. The calibration template as in claim 12 further comprising:

a first side template having a third upper surface and a third lower surface and having a fifth camera pattern located on the third upper surface such that the first side template is adapted to be positioned on a passenger side of the vehicle proximate the third front side of the front template and the third rear side of the rear template; and a second side template having a fourth upper surface and a fourth lower surface and having a sixth camera pattern located on the fourth upper surface such that the second side template is adapted to be positioned on a driver side of the vehicle proximate the fourth front side of the front template and the fourth rear side of the rear template.

14. The calibration template as in claim 9 further comprising a satellite template having a third upper surface and a third lower surface and positioned proximate the second front side of the front template, the satellite template having a radar mark on the third upper surface, the radar mark aligned on the single axis.

15. The calibration template as in claim 9 further comprising:

a first corner template having a third upper surface and a third lower surface and having a first corner mark on the third upper surface, the first corner template positioned proximate the third rear side of the rear template; and a second corner template having a fourth upper surface and a fourth lower surface and having a second corner mark on the fourth upper surface, the second corner template positioned proximate the fourth rear side of the rear template.

16. The calibration template as in claim 9 further comprising a laser attached to the first upper surface of the front template, the laser issuing a laser line that overlays along the single axis.

\* \* \* \* \*